(12) United States Patent
Haguet et al.

(10) Patent No.: US 7,395,125 B2
(45) Date of Patent: Jul. 1, 2008

(54) METHOD AND CONTROLLER FOR THE ADAPTIVE CONTROL OF AT LEAST ONE COMPONENT OF A TECHNICAL PLANT

(75) Inventors: Magalie Haguet, Yffiniac (FR); Klaus-Walter Wendelberger, Gräfenberg (DE)

(73) Assignee: Siemens Aktiengesellschaft, Munich (DE)

( * ) Notice: Subject to any disclaimer, the term of this patent is extended or adjusted under 35 U.S.C. 154(b) by 242 days.

(21) Appl. No.: 10/508,922

(22) PCT Filed: Mar. 12, 2003

(86) PCT No.: PCT/DE03/00793

§ 371 (c)(1),
(2), (4) Date: Sep. 23, 2004

(87) PCT Pub. No.: WO03/081348

PCT Pub. Date: Oct. 2, 2003

(65) Prior Publication Data

US 2005/0159825 A1    Jul. 21, 2005

(30) Foreign Application Priority Data

Mar. 26, 2002    (DE) .............................. 102 13 533

(51) Int. Cl.
*G05B 13/02*    (2006.01)
*F02D 41/00*    (2006.01)
*F02P 5/00*    (2006.01)

(52) U.S. Cl. .............................. 700/41; 700/37; 700/38; 700/39; 700/40; 700/41; 123/406.34; 123/696

(58) Field of Classification Search .................... 700/41
See application file for complete search history.

(56) References Cited

U.S. PATENT DOCUMENTS

| 3,798,426 | A |   | 3/1974  | Bristol, II |
|-----------|---|---|---------|-------------|
| 4,349,868 | A |   | 9/1982  | Brown |
| 4,748,953 | A | * | 6/1988  | Osuga et al. ................. 123/696 |
| 4,903,192 | A | * | 2/1990  | Saito et al. .................... 700/37 |
| 5,229,699 | A |   | 7/1993  | Chu et al. |
| 5,325,288 | A | * | 6/1994  | Satou ........................... 700/42 |
| 5,438,827 | A | * | 8/1995  | Ohuchi et al. .................. 60/276 |
| 5,506,768 | A | * | 4/1996  | Seem et al. .................... 700/41 |
| 5,587,896 | A |   | 12/1996 | Hansen et al. |
| 2007/0186902 | A1 | * | 8/2007 | Zhu et al. ............... 123/406.34 |

FOREIGN PATENT DOCUMENTS

| DE | 1 588 341     | 4/1970  |
| DE | 36 36 512 A1  | 4/1988  |
| DE | 197 48 718 A1 | 5/1999  |
| DE | 697 01 878 T2 | 12/2000 |
| WO | WO 97/11414   | 3/1997  |

* cited by examiner

*Primary Examiner*—Sunray Chang

(57) ABSTRACT

The invention relates to a method in which at least one component of a technical plant is controlled by means of a PI controller. The actual value of the regulating parameter is continuously determined during operation of the plant and the amplification factor of the PI controller is altered depending on the time relationship of the actual value, until the actual value remains with a tolerance band relative to the set value. The invention further relates to a controller for carrying out said method.

10 Claims, 2 Drawing Sheets

METHOD AND CONTROLLER FOR THE ADAPTIVE CONTROL OF AT LEAST ONE COMPONENT OF A TECHNICAL PLANT

CROSS REFERENCE TO RELATED APPLICATION

This application is the US National Stage of International Application No. PCT/DE03/00793, filed Mar. 12, 2003 and claims the benefit thereof. The International Application claims the benefits of German Patent application No. 10213533.9 DE filed Mar. 26, 2002, both of the applications are incorporated by reference herein in their entirety.

FIELD OF THE INVENTION

The invention relates to a method for controlling at least one component of a technical plant, and a corresponding controller.

BACKGROUND OF THE INVENTION

The starting point is a conventional control concept according to which a control variable of a component of the technical plant is held as closely as possible to the set value of the control variable by means of a PI controller. To do so, the PI controller determines a correction action for an actuator assigned to one of the components from the difference between the set value and actual value of the control variable (control deviation), so that the control variable reaches the required set value as quickly and accurately as possible and at the same time moves as little as possible from this set value in the course of the control action. A strong oscillation of the actual value of the control variable should particularly be avoided so that the control system consisting of the components of the technical plant and the controller does not have a tendency to hunt.

For the control of power station components it is, for example, known for the control parameters of a PI controller used for control, particularly the control ratio and integral-action time, to be set to a constant value in advance in each case and not to be altered again during the control action when operating the plant. The advantage of this is that only a few parameters, particularly the aforementioned controller parameters, have to be set when using a PI controller, and very often no further adjustments have to be made during the control action.

However, the use of parameter values set in advance for the PI controller is not always the optimum solution, particularly for the control of power station plants, because in the course of time during the operation of the power station plant the dynamic behavior of the technical process effected by the components of the technical plant can change. Thus, after a change of this kind in the dynamic behavior of the components the controller parameters set in advance are no longer optimum for the new operating conditions now present and under certain circumstances can even lead to failure of the control system, so that the desired control effect can no longer be achieved. For example, after a change in the dynamic behavior of the controlled system (components) and thus the control circuit formed by the components and the PI controller, the actual value of the control variable can have a tendency towards unwanted oscillations during the control action that can lead to instability of the controlled system. To make a control system of this kind again suitable for use during the operation of the technical plant, it is usually necessary to at least take the affected components of the technical plant out of service, to re-adjust the controller parameters corresponding to the changed dynamic behavior of the controlled system, which possibility renders comprehensive test runs necessary before renewed commissioning, and then to restore the components, including their controller, to service.

Apart from the fact that a controlled circuit of a technical plant that has become functionally unserviceable can be hazardous to operators and potentially damaging to machines, particularly if a control system that has become unstable creates corrections that are too great and/or actual values of the control variable that are far too large, and because of the downtime required to repair the control system a production failure of the technical plant is practically unavoidable. If the technical plant is a power station, the failure of a component of the technical plant can, for example, jeopardize the supply of electrical power to an area.

The use of constant values for the PI controller leads to problems, particularly where used for control in power stations with a steam process, because in power stations of this kind the control systems to be controlled often have a non-linear behavior. A set of parameter values for the PI controller that can be regarded as optimum for an operating state of the controlled components can under a different operating condition of these components produce control results that because of the existing non-linearities are at least of only limited use. Thus if there is an unavoidable shift in the working point of a non-linear components to be controlled or the technical plant during operation of the technical plant, the preset controller parameters are possibly no longer suitable for the new operation point (working point) for producing the desired control effect. This can even have the effect that a PI controller has an optimum control behavior for an operating point of the component, but results in completely inadequate or even dangerous control outcomes when a changeover to a new operating point occurs.

SUMMARY OF THE INVENTION

The object of the invention is therefore to specify an improved method and a controller for controlling at least one component of a technical plant. This should in particular overcome the described disadvantages from prior art. Furthermore, a control method in accordance with the invention and a controller in accordance with the invention should reduce the cost of setting the controller parameters. Furthermore, a method in accordance with the invention and a controller in accordance with the invention should enable a particularly simple start-up of a component to be controlled.

With regard to the method, the object is achieved in accordance with the invention by a method for controlling at least one component of a technical plant by means of a PI controller that has a control ratio and an integral-action time as controller parameters, with the following steps.

The integral-action time is preset.

An initial value of the control ratio is preset.

At least one set value of a control variable of the component is preset and during the operation of the technical plant, the actual value of the control variable is constantly determined and the control ratio is changed relative to the time response of the actual value, until the actual value of the control variable remains within a tolerance band with regard to the set value.

The invention is based on the consideration that the controller parameters can then be particularly well specified if the behavior of the controlled system, i.e. the interaction between the PI controller and the component to be controlled, are observed during the operation of the technical plant and the control variable of the control ratio of the PI controller is automatically changed during the operation of the technical plant corresponding to the behavior of the actual value, until the actual value of the control variable is within the stated tolerance bend with regard to the defined set value and remains there. Changes to the control ratio therefore do not take place continuously but only until the actual value of the control variable exhibits a required behavior with regard to the tolerance band, i.e. its value moves ad valorem within the tolerance band during the operation of the technical plant. If in the course of the operation of the controlled component a change in its dynamic behavior now takes place, caused for example by material wear and/or deposits of operating or auxiliary materials of the component, or by aging of parts of the component, the control ratio when carrying out the method in accordance with the invention is not changed again until the actual value of the control variant moves ad valorem from the tolerance band. This new ongoing change in the control ratio continues only until the actual value again enters the tolerance band and remains there.

By means of the method in accordance with the invention, a method for the automatic adaptation of the control ratio of the PI controller is realized, whereby during the operation of the technical plant the control ratio continues to be automatically changed relative to the behavior of the actual value of the control variable until it leads to a desired control behavior of the control component. A further change in the control ratio takes place only if the actual value of the control variable again moves ad valorem from the tolerance band. The ongoing alteration of the control ratio can take place by a fixed amount, for example by means of a stepwise change in the current value of the control ratio.

With the method in accordance with the invention, the integral-action time control parameter is specified in advance and thus is not continuously altered during the operation of the technical plant.

Investigations of controlled systems have shown that setting the integral-action time control parameter in advance is usually adequate to achieve a good, desired control behavior of the controlled system. It is thus not necessary to also continuously change the integral-action time control parameter in order to achieve a good control result during the operation of the technical plant. The advantage of this is mainly that the controlled system dynamics, e.g. for further investigations or test purposes, are easier to describe and model, because due to the integral-action time being specified in advance, the dynamic behavior of the PI controller does not change and a suitable, for example mathematical, description of the controlled system can easily be given and used.

Advantageously, the integral-action time is determined from system time constants, particularly from the sum of the system time constants of the component to be controlled.

The system time constants of a system to be controlled influence the speed with which the system reacts to a change of at least one of its input signals by changing at least one of its output signals. Almost any practical control system is subject to a delay, as it is called, and thus also includes at least one system time constant in its corresponding mathematical model equation. For example a controlled system that can be described by a third order mathematical order equation includes three system time constants. Knowledge of the values of the system time constants for a controlled system under consideration enables the delay of the controlled system to be well estimated.

It is particularly advantageous if the sum of the system time constants of the system to be controlled is formed and the integral-action time is determined by means of this sum and, in particular, is set as a multiple of this sum. Advantageously, this multiple varies in the 0.1 to 2.5 range.

In many practical cases that occur, tests have shown that a multiple with a value of approximately 1.5 produces good results, i.e. that the integral-action time of the PI controller in such cases is to be set to a value corresponding to one and half times the sum of the system time constants. Furthermore, multiples with a value of approximately 0.7 also produce good results, i.e. the integral-action time of PI controller in such cases is to be advantageously set to a value corresponding to 70% of the sum of the system time constants. When doing so, however, it is to be noted that the effect of the amount of integral action of the PI controller reduces with increasing value of the named multiple.

In a further advantageous embodiment of the invention, the control ratio is reduced in step 4 in the method in accordance with the invention if the time pattern of the actual value has a dwell time during which the actual value shows a value within the tolerance band that is smaller than a first defined time period.

With this form of embodiment, oscillations in the time response of the actual value in particular should be detected, in particular displaying themselves in that the actual value assumes a value within the tolerance band during the control action once again and subsequently enters and leaves the tolerance band. The dwell time is now determined during which the oscillating actual value moves within the tolerance band before it leaves it once again. The shorter this dwell time the faster the actual value changes relative to time, so that in a case of this kind the control ratio of the PI controller is to be reduced in order to leave the actual value within the tolerance band during the operation of the technical plant. If the dwell time is less than the first defined time period, an excessive oscillation of the actual value (the actual values goes "too fast" through the tolerance band) is assumed and the control ratio is reduced thus preventing an intolerable oscillation of this kind of the actual value beyond the limits of the tolerance band.

The first defined time periods can, for example, be determined relative to the values of the system time constants, particularly relative to the value of the sum of the system time constants. Thus, with the aforementioned comparison, the dwell time of the actual value is set in a technically useful relation to the delay of the controlled system (described by the system time constants), because an absolute definition of this, which is an excessive oscillation, cannot be given.

For example, a temperature change within a few minutes can indicate a fast process whereas a pressure change within a few minutes is usually more likely to be characteristic of a slow process.

Advantageously the control ratio in step 4 is then only reduced if, in addition, a first change rate of the actual value is greater than a second change rate of the set value.

This embodiment of the invention takes account of the fact that the set value can not only be a constant variable but can also be a changeable, particularly a fluctuating and/or oscillating variable. Values of the set value that change in this manner during the control action could lead to fluctuations and/or oscillations of the actual value of the control quantity, similar to an incorrectly set value of the control ratio. However, such fluctuations and/or oscillations of the actual value with the corresponding set value also fluctuating and/or oscillating are even desirable because the actual value of the control variable should follow the set value of the control variable as closely as possible during the control action.

In order in such cases to prevent an (unwanted) reduction in the control ratio due to a fluctuating actual value, it is provided with this form of embodiment that a first change rate of the actual value and a second change rate of the set value be determined in order to then establish, from a comparison of these two rates, whether the control ratio is to be reduced or not.

If the actual value changes more quickly than the set value (the first change rate is in this case greater than the second change rate), the control ratio is to be reduced because in this case the fluctuations of the actual value are due not only to a fluctuating set value, but also due to a set control ratio that is ad valorem too great.

In a different case, if the value of the actual value changes less quickly than the value of the set value, the control ratio is not reduced because from this it is assumed that the fluctuations of the actual value in this case are due mainly to fluctuations in the set value and consequently a reduction in the control ratio is not necessary and would also not be useful for success of the control system.

In a further advantageous embodiment of the invention, the control ratio is increased in step 4 of the method in accordance with the invention if the time characteristic of the actual value has a rise time that includes the time period from the start of a change of the set value up to reaching a momentary value of the actual value within the tolerance band, that is greater than a second, defined time period.

With this form of embodiment, the control ratio is increased if the reaction of the controlled system to a change in the set value is too slow. In addition, the aforementioned rise time of the actual value is determined corresponding to the time period between a change in the set value and an initial attainment by the actual value of a value within the tolerance band. The rise time is thus a measure of how fast the actual value of the controlled system reacts to a change, particularly a sudden change, in the set value, and reaches a (desired) value within the tolerance band relative to the set value. The second defined time period serves as a criterion in the event that the rise time of the actual value is seen to be too great and the reaction time of the controlled system to a change in the set value thus as too slow. Advantageously, this second defined time period is determined from the system time constants of the component to be controlled, particularly from the sum of the system time constants. The rise time is thus set relative to the delay in the control system so that a definition that is to be seen as a reaction to the control system that is too slow can be set in a useful technical relationship to the delay of the controlled system.

The invention furthermore leads to a controller for controlling at least one component of a technical plant, designed as a PI controller and includes a control ratio and an integral-action time as controller parameters, whereby the controller has at least the following controller components.

A first controller input by means of which the controller can be supplied with a defined value for the control ratio.

A second controller input by means of which the controller can be supplied with a control ratio.

A third controller input by means of which the controller can be supplied with a control variable of the component, and an adaption unit by means of which the actual value of the control variable can be constantly determined during the operation of the technical plant and the control ratio can be changed relative to the time relationship of the actual value, until the actual value of the control variable remains within a tolerance band relative to the set value.

The integral-action time is advantageously determined from the system time constants, particularly from the sum of the system time constants, of the controlled component.

In an advantageous embodiment, the control ratio is reduced by means of the adaption unit if the time relationship of the actual value has a dwell time during which the actual value assumes a value within the tolerance band that is less than a first defined time period.

The control ratio is then advantageously reduced by the adaption unit only if in addition a first change rate of the actual value is greater than a second change rate of the set value.

In a further advantageous embodiment of the invention, the control ratio is increased by means of the adaption unit if the time relationship of the actual value is a rise time that covers the time period from the start of a change in the set value up to reaching an instantaneous value of the actual value within the tolerance band that is greater than a second defined time period.

The explanations and notes given in conjunction with a representation of the method in accordance with the invention, and the advantages shown, can be applied as appropriate to a controller in accordance with the invention and to its forms of embodiment and are therefore not repeated at this point.

BRIEF DESCRIPTION OF THE DRAWINGS

An exemplary of an embodiment of the invention is explained in more detail below, where.

DETAILED DESCRIPTION OF THE INVENTION

Figure 1:
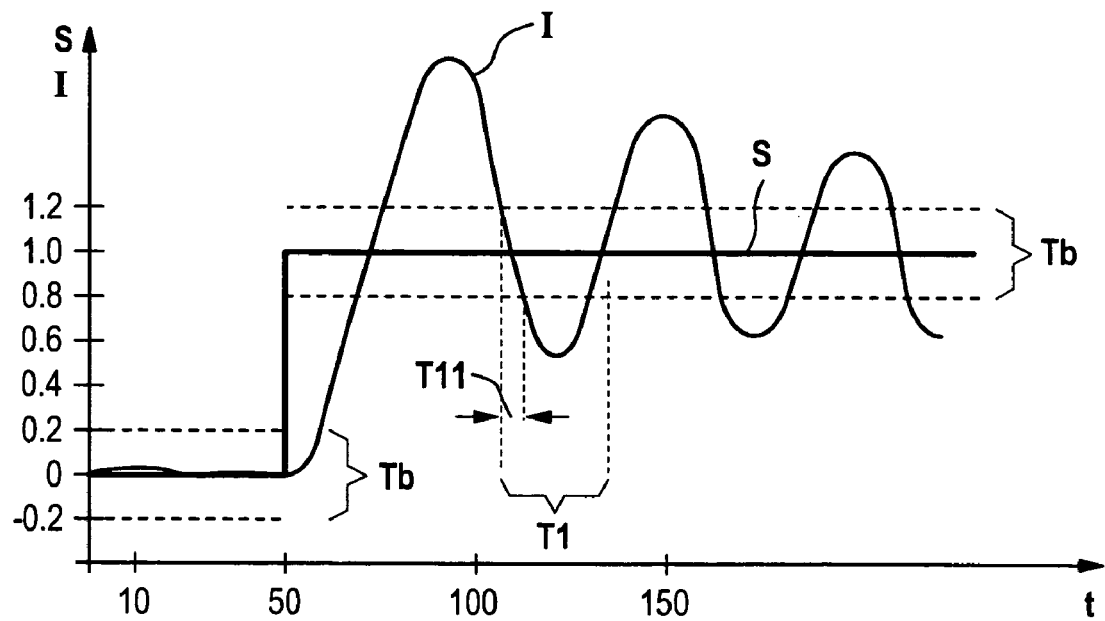
FIG. 1 shows a graphic representation of an example of the behavior of the actual value, with a dwell time and a first defined time period being given as parameters for use in accordance with the invention.

FIG. 1 show an example of the time response of an actual value I, that has an oscillation and even over a long time period does not satisfactorily approximate to a defined set value S, and thus in particular does not move within a tolerance band Tb.

The illustration in FIG. 1 shows the time behavior of the set and actual values of a controlled component of a technical plant. At time point t=50 (for example t=50 sec.), the set value S changes suddenly from S=0 to S=1 and remains constant from time point t=50. With a controlled system, it is desirable for the actual value I of the associated control variable to follow the time response of the set value S as closely as possible, whereby on one hand the set value S should be reached as quickly as possible and on the other hand excessive over- or undershoots of the actual value I relative to the set value S must be avoided in order to obtain a stable controlled system. In particular, oscillations of the actual value I that do not decay over time and/or the amplitude of which has values that do not lie within the tolerance band Tb, or even considerably overshoot it, are particularly to be avoided. The tolerance band Tb is to be matched to a particular concrete area of use and should reflect a permissible deviation of the actual value I from the desired set value S during the control action.

The limits of the tolerance band Tb need not in this case be symmetrical relative to the set value S. Rather they can be matched to the requirements of a specific application.

In the example in FIG. 1 it can be seen from the time response of the actual value I that the control ratio Kp of the basic controlled component would be too great, i.e. the PI controller used would react with an excessive proportional gain to a control deviation determined by the difference between the set and actual values, which in the case illustrated in FIG. 1 would lead to an undesirable oscillation of the actual value I.

To obtain a stable control, particularly to be able to meet the requirements of the time response of the actual value with regard to the tolerance band Tb, it is necessary, and provided by the invention, to continuously change the control ratio Kp until the actual value I of the control quantity remains within the tolerance band Tb. In this example the control ratio Kp is to be reduced. This is shown particularly by the fact that a dwell time T11 is less than a first defined time period T1. This can be approximately interpreted as the actual value I passing "too fast" through the tolerance band Tb during its time response, which indicates an undesirable oscillation of the actual value I. The comparison period (first defined time period T1) is in this case advantageously determined by means of the system time constants of the component to be controlled, so that the fact that the aforementioned term "too fast" should be defined relative to the system-dependent delay of the controlled component can be taken into account.

The continuous reduction of the control ratio Kp is ended as soon as the time response of the actual value moves to within the tolerance band Tb and remains there. Alternatively, or additionally, the reduction in the control ratio Kp can be achieved by multiplication with a constant value between 0 and 1, and can also be achieved each time the actual value is passed through the tolerance band.

Figure 2:
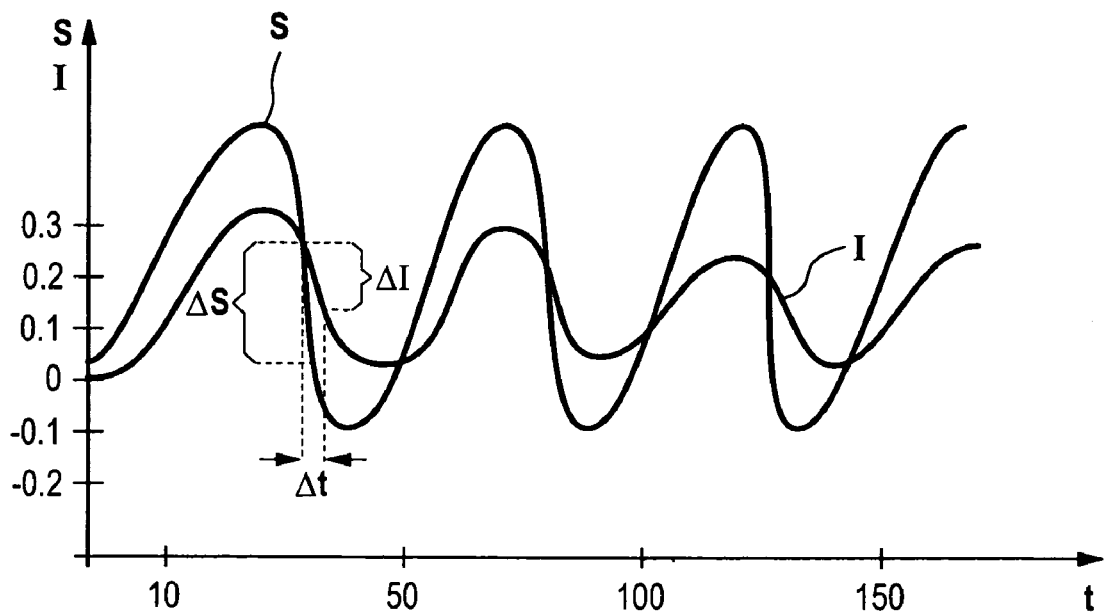
FIG. 2 shows an example of the behavior of the set and actual values with both quantities having an oscillation and parameters for determining the rate of change of the set and actual value being used for use in accordance with the invention.

FIG. 2 shows the time response of the set value S and the actual value I, with the set value S having an oscillation, i.e. no areas of constant behavior particularly in contrast to FIG. 1.

As a consequence, the actual value I that should follow the time response of the set value S as closely as possible has an oscillating pattern.

The conclusion that the control ratio Kp of the PI controller used is set too high, therefore causing the oscillation of the actual value I need not necessarily be drawn from the example of the oscillation of the actual value I. The lowering of the control ratio Kp in a case such as this could lead to completely unsatisfactory control action.

It is much more a matter of checking whether the instantaneous set value of the control ratio Kp is responsible for the oscillation of the actual value I or whether the oscillation of the actual value I is caused merely by the desired following by the actual value I relative to the oscillating set value S in the example in FIG. 2.

The control ratio Kp should then only be reduced if the actual value I changes more quickly than the set value S.

To determine the named change rates of set value S and actual value I, FIG. 2 shows an example for a time period Δt of the change ΔS in the set value S during the reference time period Δt and the change ΔI of the actual value I. The quotient ΔS and Δt or ΔI and Δt enables the named rates of change of the actual value I and set value S to be determined.

In the example in FIG. 2, the rate of change of the actual value I (first rate of change) is less than the rate of change of the set value S (second rate of change). It can therefore be concluded that the oscillations of the actual value I are due to the oscillations of the set value S, so that in this case the control ratio Kp of the PI controller used is not to be reduced.

Figure 3:
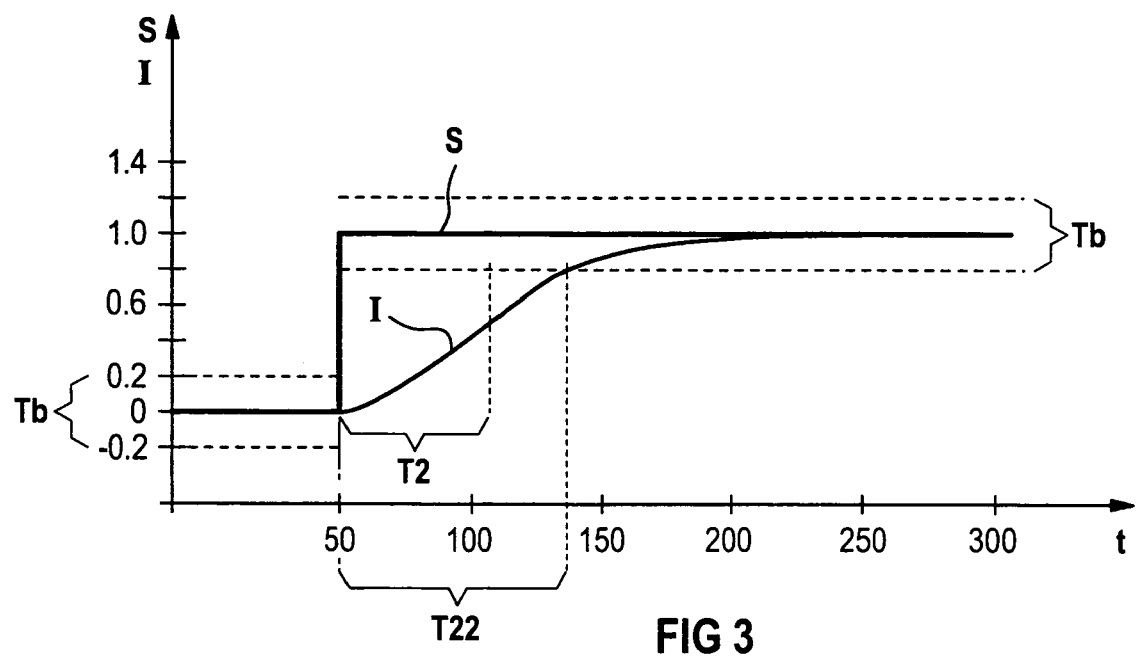
FIG. 3 shows a further example of the time response of the actual value, with a rise time and a further defined time period being given as parameters for use in accordance with the invention.

FIG. 3 shows an example of the time response of the actual value I, whereby it only reaches the defined set value S relatively slowly.

With a time response of this kind of the actual value I, it can be concluded that the control ratio Kp of the PI controller used is set too low, i.e. the PI controller reacts to the difference between the set and actual values (control deviation) with a proportional gain that is too small.

To determine whether the time response of the actual value I follows the set value S too slowly and the control ratio Kp therefore is to be raised, parameters, i.e. a rise time T22 and a second defined time period T2, are shown in the example in FIG. 3.

The rise time T22 in this case includes the time period from the start of a change of the set value S to achievement of an instantaneous value of the actual value I within the tolerance band. If this rise time T22 is greater than the second defined time period T2, the component controlled by a PI controller then reacts too slowly to a set value change and the control ratio Kp is to be increased.

Advantageously, the second defined time period T2 is determined from the system time constants of the component to be controlled, so that, depending on the delay of the controlled component (controlled system), it can be correctly, technically determined whether the rise time T22 of the actual value I is too great and the control ratio Kp is therefore to be increased.

The continuous increase in the control ratio Kp in the case in FIG. 3 continues until the actual value I remains within the tolerance band Tb.

Figure 4:
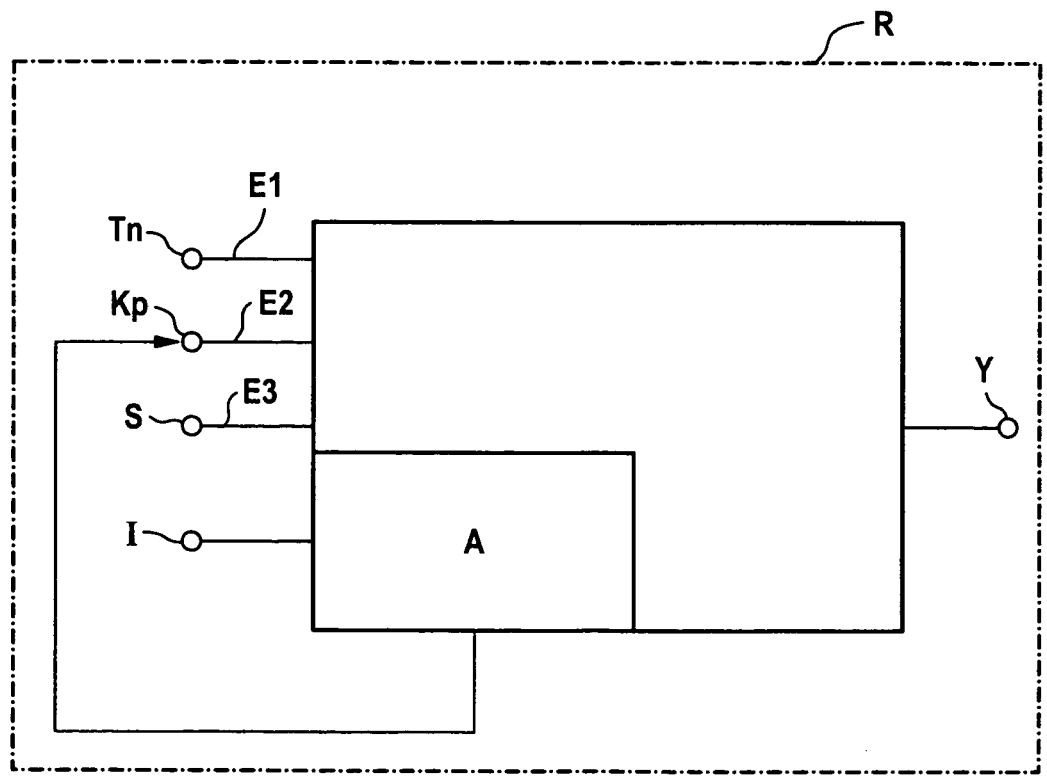
FIG. 4 shows a controller in accordance with the invention.

FIG. 4 shows a controller R in accordance with the invention.

The controller R is used to control at least one component of a technical system and is designed as a PI controller.

The controller R has a control ratio Kp and an integral-action time Tn as control parameters.

A defined integral-action time Tn can be applied to a first controller input E1.

The control ratio Kp can be applied to a second control input E2 and a third control input E3 receives a set value S of a control quantity of the component.

The controller R also has an adaption unit A by means of which the actual value I of the control variable can be determined during the operation of the technical plant and the control ratio Kp can be changed relative to the time response of the actual value I, until the actual value I of the control variable remains within a tolerance band Tb relative to the set value S.

At the start of the control action, an initial value Kp0 for the control ratio Kp is applied to input E2. This initial value Kp0 is then changed constantly during the control action relative to the time response of the actual value, until the actual value I of the control variable remains within a tolerance band Tb relative to the set value S. The controller R also has a controller output Y that delivers a correcting variable by means of which the component to be controlled is controlled in order to achieve a required behavior of the actual value I.

It is pointed out that the terms control input (E1, E2, E3) are not to be limited in design to the fact that a physical connection to which the named quantities are to be applied must be present with a controller in accordance with the invention.

The term controller input should rather comprise all methods by means of which the PI controller can be supplied with the named variables.

In the case of an analogous realization of the PI controller, for example by means of connected operational amplifiers, the term controller input should comprise all connection possibilities of the operational amplifier by means of electronic components, which in their interconnection realize a defined value for at least one of the variables Tn and Kp.

In the case of digital realization of the PI controller, for example a digital processor, the term controller input comprise include all memory areas in which values for the controller parameters Tn and Kp are described and/or from which these values can be exported.

The invention claimed is:

1. A method for controlling a component of a technical plant by a proportional-plus-integral (PI) controller that has control parameters including a control ratio indicative of a proportional gain and an integral-action time, comprising;
   defining a value of the integral-action time;
   defining an initial value of the control ratio;
   defining a set value of a control quantity of the component;
   inputting into the controller the value of the integral-action time, the initial value of the control ratio and the set value of the control quantity;
   determining the actual value of a controlled variable during operation of the technical plant;
   adapting the value of the control ratio relative to a time response of the actual value until the actual value of the controlled variable remains within a tolerance band relative to the set value during operation of the technical plant; and
   reducing the value of the control ratio if the time response of the actual value has a dwell time during which the actual value of the controlled variable varies within the tolerance band, said dwell time being smaller than a first defined time period during operation of the technical plant, wherein a duration of the dwell time relative to a duration of the first defined time period is selected to determine a sufficiently fast rate of change of the controlled variable relative to a time constant of the component, and wherein the reduction of the value of the control ratio is configured to reduce the rate of change of the controlled variable.

2. The method in accordance with claim 1, wherein the integral-action time is determined from the system time constants.

3. The method in accordance with claim 1, wherein the integral-action time is determined from the sum of the system time constants of the component to be controlled.

4. The method in accordance with claim 1, wherein the control ratio is reduced if a first change rate of the actual value is greater than a second change rate of the set value.

5. The method in accordance with claim 1, wherein the control ratio is increased if the time response of the actual value has a rise time that includes the period from the start of a change of the set value until reaching an instantaneous value of the actual value within the tolerance band that is greater than a second defined time period.

6. A proportional-plus-integral (PI) controller for controlling a component of a technical plant, comprising:
   a logic element having a control ratio indicative of a proportional gain and an integral-action time;
   a first controller input adapted to provide the controller with a defined value for the integral-action time;
   a second controller input adapted to provide the controller with the control ratio;
   a third controller input adapted to provide the controller with a set value of a control quantity of the component; and
   an adaption device that applies the actual value of a controlled variable during the operation of the technical plant so that the value of the control ratio can be adapted relative to the time response of the actual value until the actual value of the controlled variable remains within a tolerance band relative to the set value wherein the value of the control ratio is reduced by the adaptation device if the time response of the actual value has a dwell time during which the actual value of the controlled variable within the tolerance band, said dwell time being smaller than a first defined time period, wherein a duration of the dwell time relative to a duration of the first defined time period is selected to determine a sufficiently fast rate of change of the controlled variable relative to a time constant of the component, and wherein the reduction of the value of the control ratio by the adaptation device is configured to reduce the rate of change of the controlled variable.

7. The controller in accordance with claim 6, wherein the integral-action time is determined from system time constants.

8. The controller in accordance with claim 6, wherein the integral-action time is determined from the sum of the system time constants of the component to be controlled.

9. The controller in accordance with claim 6, wherein the control ratio is reduced by the adaptation unit if additionally a first change rate of the actual value is greater than a second change rate of the set value.

10. The controller in accordance with claim 6, wherein the control ratio is increased by the adaptation unit if the time response of the actual value has a rise time that includes the time period from the start of a change of the set value until achievement of an instantaneous value of the actual value within the tolerance band, that is greater than a second defined time period.

* * * * *